United States Patent
Nadolsky et al.

(10) Patent No.: US 6,670,086 B2
(45) Date of Patent: Dec. 30, 2003

(54) COUPLED ALCOHOL ETHOXYLATES FOR IMPROVED THERMAL PROPERTIES

(75) Inventors: Richard J. Nadolsky, Houston, TX (US); Thomas Joseph Clark, Sugar Land, TX (US); David D. Truong, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/153,846

(22) Filed: May 21, 2002

(65) Prior Publication Data

US 2003/0220435 A1 Nov. 27, 2003

(51) Int. Cl.[7] .................................................. G03G 9/08
(52) U.S. Cl. ................................ 430/106.2; 430/108.1; 430/108.8
(58) Field of Search ......................... 430/108.1, 106.2, 430/108.8

(56) References Cited

U.S. PATENT DOCUMENTS

| | | | |
|---|---|---|---|
| 4,851,318 A | * | 7/1989 | Hsieh et al. ............. 430/137 |
| 5,981,128 A | | 11/1999 | Tavernier et al. |
| 6,042,983 A | | 3/2000 | Tavernier et al. |
| 6,071,664 A | | 6/2000 | Tavernier et al. |
| 6,194,116 B1 | | 2/2001 | Nishihara et al. |
| 6,238,835 B1 | | 5/2001 | Tavernier et al. |
| 6,309,453 B1 | | 10/2001 | Banning et al. |
| 6,335,139 B1 | | 1/2002 | Gambayashi et al. |
| 6,432,605 B1 | * | 8/2002 | Yoon .................. 430/137.15 |

OTHER PUBLICATIONS

"Polymers", Baker Hughes, Baker Petrolite, [Internet]: [2002; cited May 15, 2002]. Available from: http://www-.bakerhughes.com/bakerpetrolite/polymers/alcohol_ethoxylates.htm.

* cited by examiner

Primary Examiner—John Goodrow
(74) Attorney, Agent, or Firm—Madan, Mossman & Sriram, P.C.

(57) ABSTRACT

Coupled alcohol ethoxylates made by reacting alcohol ethoxylates with a diisocyanate have been found to improve the thermal properties of toner compositions and powder coatings. The alcohol ethoxylates have saturated linear alcohol portions of from about 20–70 carbon atom chain lengths. The diisocyanates may be aromatic diisocyanates such as toluene diisocyanate (TDI) and/or methylenediphenyl diisocyanate (MDI). Preferably, about one mole of diisocyanate is reacted with about two moles of the alcohol ethoxylates to form the coupled alcohol ethoxylates that are useful compatibilizers to improve the homogeneity of toner compositions and powder coating compositions.

19 Claims, No Drawings

COUPLED ALCOHOL ETHOXYLATES FOR IMPROVED THERMAL PROPERTIES

FIELD OF THE INVENTION

The invention relates to reaction products of ethoxylated alcohols, and most particularly relates, in one non-limiting embodiment, to coupled alcohol ethoxylates for improving the thermal properties of compositions in which they are included.

BACKGROUND OF THE INVENTION

The reaction of isocyanates with hydroxyl-containing materials is well known and widely practiced. The most common use of this reaction is for the production of polyurethanes by reaction of various polyols with diisocyanates. For this purpose, primarily toluene diisocyanate (TDI) or methylenediphenyl diisocyanate (MDI) or a combination of the two has been used with a broad range of polyols. More recently, certain aliphatic or alicyclic diisocyanates (e.g., cyclohexane diisocyanate or isophorone diisocyanate) have been used in making certain polyurethanes, especially for coatings. Such aliphatic diisocyanates, either alone or in combination with the aforementioned aromatic diisocyanates, are used because they provide added flexibility to the finished polyurethane coating.

It is also well known that, aside from reacting with alcohols and polyols, isocyanates will react with other materials containing groups possessing a replaceable hydrogen atom. Such materials include primary and secondary amines, hydroxylamines, carboxylic acids, phenols and water. With water, the initial reaction converts the isocyanate to a carbamic acid, which, due to the heat generated, loses carbon dioxide to give a primary amine. The amine, in turn reacts with another isocyanate to form a urea molecule, which may further react to form a biuret. In this fashion, one mole of water will consume two or more equivalents of isocyanate while releasing a mole of $CO_2$. In producing certain foamed polyurethane products, excess diisocyanate is incorporated along with water to purposely generate some $CO_2$, which acts as a blowing agent. In these cases, the urea/biuret species form part of the polymer structure.

In the toner industry that manufactures powders for use in xerographic reproduction, accumulation of production waste classified as ultra fines has become a major concern. Thus, it would be desirable if some method or component that would improve the homogeneity or compatibility of the various toner components could be devised. It would also be advantageous to improve the compatibility of the various components of powder coatings, and to improve the adhesion of polishes and waxes to the article treated.

SUMMARY OF THE INVENTION

An object of the invention is to provide a compatibilizing component that would improve the homogeneity of powdered toners and powdered coatings.

Other objects of the invention include providing a component that would improve the adhesion of polish or wax to the article to which it is applied.

Another object of the invention is to provide a compatibilizing component that is readily manufactured.

In carrying out these and other objects of the invention, there is provided, in one form, a coupled alcohol ethoxylate produced by reacting an ethoxylated derivative of a saturated linear alcohol with a diisocyanate. In one non-limiting embodiment, the linear alcohol may have a carbon atom chain length ranging from about 20 to about 70.

In another embodiment of the invention, there is provided a toner composition having resin particles, pigment particles, wax particles, and an amount of a compatibilizing component effective to improve the homogeneity of the composition, where the compatibilizing component is a coupled alcohol ethoxylate.

In yet another embodiment of the invention, there is provided a powder coating that includes resin particles, pigment particles, wax particles, extender particles, and an amount of a compatibilizing component effective to improve the homogeneity of the composition, where the compatibilizing component is a coupled alcohol ethoxylate.

In still another embodiment of the invention, there is provided a polish (wax) for an article comprising an amount of a coupled alcohol ethoxylate effective improve adhesion.

DETAILED DESCRIPTION OF THE INVENTION

It has been discovered that coupled alcohol ethoxylates are useful dispersion aids for toners and powder coatings and the like. Indeed, the inventors in their study focusing on the advantages of inventive compounds in dispersing wax in toner resin came to a number of important conclusions:

Compatibilizers will assist in the production process to yield a more homogenous mixture of small wax domains.

A homogenous mix of small wax domains should increase production efficiency, while decreasing generation of waste material.

The toner waste material should experience a decrease in free wax, which would encourage the recycling of the material—thereby greatly reducing storage and disposal concerns.

Image quality will be improved by discouraging drum filming caused by the presence of free wax.

A better wax dispersion in toners and powder coatings will also increase the life of consumable machine parts.

The coupled alcohol ethoxylates of the present invention relate to toners as a dispersion aid or compatibilizer of the various ingredients within the binder resin or melt blend. The toner of the present invention can be obtained through the addition of various pigments, charge control agents, magnetic powders and other optional components to the binder resin. The melt is subsequently dispersed through the use of a super mixer, Danbury mixer, roll mill, kneader or extruder, as non-limiting examples. Rough pulverization of the cooled melt is carried out through the use of a cutter mill, hammer mill or similar process; fine pulverization with a jet mill, as non-limiting examples; classifying with a wind power classifier or other classifier known in the art. Normally, a surface treatment of the resulting product with various additives is included as a finishing step of the process.

The dispersing of the ingredients within the binder resin is often thought to be the most critical part of toner production. A good dispersion used with a robust formulation yields excellent image density and background without sacrificing the normal increase in toner consumption. The dispersion is also useful in enabling the producer to utilize the recycle, or fine material, often generated as a by-product of the operation. Adequate dispersion of charge control agents, and iron oxides will help to stabilize the charge of the toner particles thereby increasing the developer life.

The resin particles may include, but are not necessarily limited to, a styrene-butadiene, styrene acrylate, a styrene methacrylate, a polyester, an epoxy, an acrylic or mixtures thereof. A preferred resin selection includes, but is not necessarily limited to, a polymer such as a polyester, copolyester, and mixtures thereof, including reactively extruded polyesters. In another non-limiting embodiment of the invention, the resin particles comprise polyester/β-hydroxyalkylamide powders. A particularly preferred form of β-hydroxyalkylamide are PRIMID® powders available from EMS-Chemie AG. In one non-limiting embodiment, PRIMID XL-552 (bis-N,N-dihydroxyethyladipamide) is preferred although other β-hydroxyalkylamides are suitable.

Representative examples of the above-mentioned pigment include, but are not necessarily limited to, carbon black, nigrosine, aniline blue, charcoal blue, chromium yellow, ultramarine blue, dupone oil red, quinine yellow, Methylene Blue Chloride, phthalocyanine blue, malachite green ocsalate, lamp black, Rose Bengal mixture thereof and the like. The ratio of the pigments is such that the corresponding image is visibly and measurably sufficient.

Representative examples of the magnetic powder include, but are not necessarily limited to, metals having strong magnetic properties, such as ferrites, magnetite, iron, cobalt, nickel, alloys thereof and compounds comprising these elements; and alloys which do not comprise strong magnetic elements but show strong magnetic properties when preferable heat treatment is performed. Mixtures of these magnetic powders are also acceptable. These magnetic powders are dispersed with an average weight of 20 to 70 parts to 100 parts of the binder resin, preferably between 40 and 60 parts by weight. The two-component developer can be obtained through mixing of the toner with carriers such as ferrite or iron powders. The toner utilized in a two-component system typically contains magnetic powders that are dispersed with an average weight of 0.1 to 5 parts to 100 parts of the binder resin.

The present invention relates to the modification of certain materials to increase their softening temperatures, glass transition temperature ($T_g$) and other thermal properties while retaining their basic compatibilities with other materials. Specifically, UNITHOX® Ethoxylated Alcohols (available from Baker Petrolite) are modified by reaction with toluene diisocyanate (TDI) or methylenediphenyl diisocyanate (MDI) or mixtures of the two, to couple the terminal hydroxyls of two poly(oxyethylene) groups via formation of a bridging aromatic diurethane linkage. Without wishing to be bound by any single theory, it is believed that such bridging results in a "hairpin" configuration in which the aromatic group is at the central curve, poly(oxyethylene) groups trail down each prong and fully linear, saturated hydrocarbon chains, ranging from 20 to 70 or more carbon atoms each, complete the prongs. Such a configuration will give better packing of molecules when compared with the non-coupled UNITHOX resulting in a more stable, more crystalline material.

In one non-limiting embodiment of the invention, the equivalent ratio of diisocyanate per hydroxyl equivalent in the ethoxylated alcohol ranges from about 0.2:1 to about 1.5:1. As noted, it is generally expected that one mole of diisocyanate reacts with 2 moles of ethoxylated alcohol. However, as will be shown, different reactant proportions give somewhat different results. The reaction of the diisocyanate may be catalyzed with any conventional catalyst, including, but not necessarily limited to, tertiary amines, tin compounds, etc.

More specifically, the ethoxylated alcohols may contain saturated hydrocarbon chains of from about 20 to 70 carbon atoms, preferably from about 30 to 50 carbon atoms. The alcohols may be ethoxylated with anywhere from about 4 to about 90 moles of ethylene oxide per mole of alcohol, preferably from about 10 to about 30 moles of ethylene oxide per mole of alcohol. The ethoxylation may be conducted by any known means in the art.

It is known that certain UNITHOX products are useful as dispersing agents for pigments in water as well as for dispersing hydrocarbon waxes (e.g., polyethylene, paraffin, microcrystalline waxes) in water. Also, certain UNITHOX products exhibit compatibility with various synthetic resins. The above-described modification does not significantly alter these properties and compatibilities. The proportion of coupled alcohol ethoxylates in a toner composition may range from about 0.05 to about 20 wt. %, based on the total toner composition, preferably from about 1.0 to about 10.0 wt. %, and most preferably from about 1.5 to about 5.0 wt. %.

An unmodified UNITHOX product may be used to disperse pigment, wax and other additives in a polyester, copolyester or reactively extruded polyester that is used as a binder resin for a toner. However, when used at the required level, sometimes the resulting toner particles tend to block under conditions of higher temperature and humidity that are frequently encountered especially during the summer months. Coupling these ethoxylates as described above will greatly reduce this blocking without significantly impacting their dispersing properties. This reduction in blocking is due not only to the increased thermal properties of the coupled ethoxylates, but also to a decrease in their hygroscopicity and an increase in their hardness. A decrease of the hygroscopic nature of the commercially available alcohol ethoxylate product is expected to help avoid subsequent storage/stability concerns of the finished toner powder. Additionally, an increase in hardness of the commercially available alcohol ethoxylate product is expected to improve the traditional production of toner.

Similar proportions of coupled ethoxylated alcohol may be used in powder coating compositions. Such powder coating compositions typically include resin particles, wax particles, pigment particles, extender particles, and optionally a degassing agent. The degassing agent may be present in an amount from about 0.05 to about 20 wt. %. The wax particles in powder coatings may be reactive or nonreactive with the other components in the system. Similarly, it is expected that the coupled ethoxylated alcohols of this invention will find utility in polishes and waxes for articles such as automobiles, glass, ceramics, etc. to improve the adhesion of the wax or polish thereto. Within the scope of this invention, when the term "polish" is used, it is intended to include the term wax, where wax is used in this context of an automotive wax, glass polish, ceramic polish or wax or polish for another article, in contrast to the wax particles of the toner or powder compositions.

The inventive compatibilizing components are also expected to find utility as dispersing agents for various pigments and hydrocarbon waxes in water-based systems.

The invention will be further discussed with respect to the following Examples that are presented not to limit the invention but simply to further illustrate it.

EXAMPLE 1

Coupling Reaction of UNITHOX 750 With TDI

UNITHOX 750 Ethoxylated Alcohol (melt point 218° F. (103° C.) hydroxyl value 32.6) was placed in a stainless steel beaker along with 0.05–0.08 weight percent of Armeen M2HT (methyl dihydrogenated tallow amine—a tertiary amine catalyst). The mixture was heated to 130–135° C., then toluene diisocyanate was added over a period of several minutes and the mixture stirred for 0.5 hr then poured into a shallow pan to cool. After cooling, the product was ground in a Wylie mill to<2 mm particle size. The IR spectra of the resulting products indicated no isocyanate remained. The following materials were made by this procedure:

TABLE I

| Ex. | Designation | equiv. TDI/equiv OH | M.P (° C.) | OH Value |
|---|---|---|---|---|
| 1A | X-5435 | 0.2 | 105.8 | 31.1 |
| 1B | X-5436 | 0.5 | 105.6 | 27.6 |
| 1C | X-5437P | 1.0 | 105.3 | 20.3 |
| 1D | X-5437 | 1.5 | 108.9 | 17.3 |

EXAMPLE 2

Coupling Reaction After Thermally Removing Water

The same procedure was followed as for Example 1D, except the UNITHOX 750 and Armeen M2HT were held at 120–130° C. for 30 minutes before adding the TDI. With the addition of TDI, some bubbling was observed and temperature increased to 150° C. After 1 hr. at this temperature, the product was cooled and ground as in Example 1 to give a material having a hydroxyl value of 15.2.

EXAMPLE 3

Coupling Reaction at Higher Temperature

Followed the procedure of Example 1D, except the UNITHOX 750 and Armeen M2HT were held at 135–140° C. for 30 minutes before adding TDI. Addition of TDI was accompanied by bubbling and increasing of the temperature to 157° C. After 1 hr. at this temperature, the product was cooled and ground as in Example 1 to give a material having a melt point of 251° F. and hydroxyl value of 11.8.

EXAMPLE 4

Coupling Reaction After Water Removal Under Vacuum

Five-hundred g of UNITHOX 750 (hydroxyl value of 36.8) was placed in a reaction vessel equipped with an agitator, temperature controller, gas bubbler, nitrogen inlet and vacuum inlet. The temperature was maintained at 150° C. with nitrogen sub-surface sparging. Vacuum was then applied to the stirred molten mass for 16 hours. The temperature was then reduced to 120° C. and, under a gentle stream of nitrogen, 28.56 g of TDI was gradually added to the molten mass from an addition funnel. After mixing for 4 hours, the product was poured into a shallow pan to cool and ground as in Example 1. The product had hydroxyl value of 13.2.

EXAMPLE 5

Coupling Reaction of UNITHOX 490 and TDI

Placed 1320 g of UNITHOX 490 Ethoxylated Alcohol (OH value 9.7) in a 4 liter stainless steel beaker along with 1.0 g of Armeen M2HT. When the stirred mixture became molten, nitrogen was bubbled through it. Maintained stirring and nitrogen flow for 30 minutes at 135–140° C., then added 39.2 g of TDI and stirred for 1 hr. at 150–160° C. The product was then poured into a shallow pan to cool, then ground in a Wylie mill to give particles<2 mm in size. The product had a melt point of 172.5 F. and hydroxyl value of 6.8.

EXAMPLE 6

Comparison of Moisture Pick-up

Samples of UNITHOX 750, product from Example 3 and product from Example 4 were left for 65 hours in a closed desiccator containing a supersaturated solution of ammonium chloride to give an approximately 80% RH atmosphere. Upon removal, samples were stored in tightly sealed glass jars. Water content of each material was determined by a modified Karl Fischer method. Weight loss of each material at 130° C. was also determined after various periods of time. Results are tabulated below

TABLE II

| Material | %H$_2$O | Weight Loss After | | |
|---|---|---|---|---|
| | | 1.5 hrs | 3.0 hrs | 4.0 hrs |
| 750* | 5.3 | 6.73% | 7.70% | 9.22% |
| Ex 3 | 4.7 | 5.27% | 5.35% | 5.35% |
| Ex 4 | 4.3 | 4.90% | 5.07% | 5.22% |

*UNITHOX 750

EXAMPLE 7

Compounding of Commercially Available UNITHOX® 750 Material

A supplied linear polyester resin was blended at a rate of 90% with commercially available UNITHOX® 750 material at a rate of 10%. The blending process included intensively mixing the products at a high rpm in a Henschel mixer for approximately 5 minutes. The blend was then fed into a Werner & Pfleiderer twin screw extruder for compounding. The mixing in the extruder was accomplished using the following conditions: barrel temperatures were set at approximately 100° C., screw speed of 200 revolutions per minute, and screw torque greater than 30% and less than 50%. The extrudate melt upon exiting the die was cooled through the use of chill rollers and subsequently pulverized to approximately 1 mm. The resulting material was tested for thermal properties using a CFT-500D Capillary Rheometer from Shimadzu Corporation (See Table III). The homogeneity or wax dispersion was analyzed with a Beckman/Coulter LS-230 particle size analyzer (see "Preparation of Compounded Material for Dispersion Analysis" below). The control sample for the thermal analysis corresponds to the resin thermal properties. The theory maintained behind this relates to the fact that since approximately 90% of the material consists of the binder resin; the compatibilizer cannot increase the thermal properties much beyond the resin.

$T_s$: Softening Temperature $T_{fb}$: Flow beginning or melting temperature $T_{1/2}$: Thermal degradation point—beyond which all crystallites are lost and thermal degradation probability increases.

$T_{end}$: Viscosity at or near 0

Preparation of Compounded Material for Dispersion Analysis

Added to a beaker containing approximately 30 mL of ethyl acetate was 0.1 g of compounded, 1 mm material. The material was mixed with the solvent at a medium speed in room temperature conditions for approximately 30 minutes. The solution was then analyzed using a small volume sample module filled with ethyl acetate connected to a Coulter LS-230 instrument. The resultant particle size was recorded—See Table IV. The table lists the volume (weighted) mean and median result. It also includes a maximum particle size measured with the instrument. The particle size corresponds to the wax domains. The homogeneity can be measured by the particle size, with the smaller particles corresponding to the more homogenous sample.

EXAMPLES 8–10

Compounding of Experimental Material

Material was compounded and analyzed the same as in Example 7 with the following alterations to utilize the experimental material:

X-5435 (0.2:1 TDI loading) was used at a rate of 10% in Example 8

X-5436 (0.5:1 TDI loading) was used at the same rate in Example 9

X-5437P (1:1 TDI loading) was used at the same rate in Example 10

TABLE III

| Ex. | $T_s$(° C.) | $\Delta T_s$ (° C.) | $T_g$(° C.) | $\Delta T_g$(° C.) | $T\frac{1}{2}$ (° C.) | $\Delta T\frac{1}{2}$ (° C.) | $T_{end}$ |
|---|---|---|---|---|---|---|---|
| Control | 68.3 | | 77.0 | | 98.9 | | 104.9 |
| 7 | 58.7 | −9.6 | 74.0 | −3.0 | 92.9 | −6.0 | 98.3 |
| 8 | 59.6 | −8.7 | 74.3 | −2.7 | 93.5 | −5.4 | 98.2 |
| 9 | 60.5 | −7.8 | 74.7 | −2.3 | 94.3 | −4.6 | 99.0 |
| 10 | 61.7 | −6.6 | 76.1 | −0.3 | 95.7 | −3.2 | 100.6 |

TABLE IV

| Ex. | Wax | Volume Mean (μm) | Volume Median (μm) | Max. Particle (μm) |
|---|---|---|---|---|
| 7 | UNITHOX ® 750 | 0.108 | 0.087 | 0.496 |
| 8 | X-5435 | 0.152 | 0.142 | 0.953 |
| 9 | X-5436 | 0.171 | 0.166 | 0.953 |
| 10 | X-5437P | 0.248 | 0.259 | 1.149 |

EXAMPLE 11

Capillary Rheometer Test of Coupled UNITHOX

The following tables give results for UNITHOX 750. (Table IV) and for several coupled UNITHOX 750 (Table V) products, along with a coupled UNITHOX 490 (Table VI) product.

TABLE V

| | $T_s$(° C.) | $\Delta T_s$ (° C.) | $T_g$(° C.) | $\Delta T_g$(° C.) | $T\frac{1}{2}$ (° C.) | $\Delta T\frac{1}{2}$ (° C.) | $T_{end}$ |
|---|---|---|---|---|---|---|---|
| 750* | 47.4 | | 58.1 | | 67.3 | | 72.1 |
| Ex. 2 | 78.1 | 30.7 | 84.1 | 26.0 | 91.4 | 24.1 | 93.8 |
| Ex. 4 | 78.5 | 31.1 | 90.4 | 32.3 | 97.7 | 30.4 | 100.0 |

*UNITHOX 750

TABLE VI

| | $T_s$(° C.) | $\Delta T_s$ (° C.) | $T_g$(° C.) | $\Delta T_g$(° C.) | $T\frac{1}{2}$ (° C.) | $\Delta T\frac{1}{2}$ (° C.) | $T_{end}$ |
|---|---|---|---|---|---|---|---|
| Ex. 5 | 51.3 | | 70.0 | | 73.5 | | 74.6 |

It should be noted that all temperatures for the inventive Examples increased over the control Example of UNITHOX 750, as desired.

Many modifications may be made in the composition and implementation of this invention without departing from the spirit and scope thereof that are defined only in the appended claims. For example, the exact nature of the ethoxylated alcohol and diisocyanate and relative proportions may be different from those used here. Various combinations and proportions of toner components and powder coatings other than those exemplified here are also expected to find utility in providing improved toner compositions and powder coating compositions, respectively.

We claim:

1. A toner composition comprising:
   resin particles;
   pigment particles;
   wax particles; and
   an amount of a compatibilizing component effective to improve the homogeneity of the composition, where the compatibilizing component is a coupled alcohol ethoxylate, where the coupled alcohol ethoxylate has a decrease in hygroscopic nature and an increase in thermal properties compared with a corresponding non-coupled alcohol ethoxylate.

2. The toner composition of claim 1 where the resin particles are selected from the group consisting of polyesters, copolyesters and mixtures thereof, reactively extruded polyesters, styrene butadiene copolymers, styrene acrylate copolymers, and styrene methacrylate copolymers.

3. The toner composition of claim 1 where the pigment particles are magnetic.

4. The toner composition of claim 1 where the pigment particles comprise carbon black and magnetites.

5. The toner composition of claim 1 where the pigment particles are selected from the group consisting of magenta, cyan, yellow and mixtures thereof.

6. The toner composition of claim 1 further comprising additional wax components, different from the wax particles, to improve fix/release characteristics.

7. The toner composition of claim 1 where the compatibilizing component is the reaction product of an ethoxylated alcohol with a diisocyanate.

8. The toner composition of claim 7 where the diisocyanate is selected from the group consisting of toluene diisocyanate (TDI), methylenediphenyl diisocyanate (MDI), and mixtures thereof.

9. The toner composition of claim 1 where the compatibilizing component is the reaction product of an ethoxylated alcohol with an aromatic diisocyanate in an approximate ratio of from 0.2 to 1.5 equivalents of aromatic diisocyanate per OH equivalent of ethoxylated alcohol.

10. A powder coating comprising:
    resin particles;
    pigment particles;
    wax particles;
    extender particles; and
    an amount of a compatibilizing component effective to improve the homogeneity of the composition, where the compatibilizing component is a coupled alcohol ethoxylate, where the coupled alcohol ethoxylate has a decrease in hygroscopic nature and an increase in thermal properties compared with a corresponding non-coupled alcohol ethoxylate.

11. The powder coating of claim 10 further comprising a degassing agent.

12. The powder coating of claim 11 where the degassing agent is present in an amount of from about 0.05 percent to about 20 percent by weight based on the entire coating composition.

13. The powder coating of claim 10 where the resin particles are selected from the group consisting of polyester, epoxy, and acrylic and mixtures thereof.

14. The powder coating of claim 10 where the resin particles comprise polyester/β-hydroxyalkylamide powders.

15. The powder coating of claim 10 where the compatibilizing component is present in an amount of from about 0.05 percent to about 20 percent by weight based on the entire coating composition.

16. The powder coating of claim 10 where the compatibilizing component is the reaction product of an ethoxylated alcohol with a diisocyanate.

17. The powder coating of claim 16 where the diisocyanate is selected from the group consisting of toluene diisocyanate (TDI), methylenediphenyl diisocyanate (MDI), and mixtures thereof.

18. The powder coating of claim 10 where the compatibilizing component is the reaction product of an ethoxylated alcohol with an aromatic diisocyanate in an approximate ratio of from 0.2 to 1.5 equivalents of aromatic diisocyanate per OH equivalent of ethoxylated alcohol.

19. The powder coating of claim 10 where the wax particles are selected from the group consisting of non-reactive and reactive wax particles.

* * * * *